United States Patent [19]
Luo

[11] Patent Number: 5,909,491
[45] Date of Patent: Jun. 1, 1999

[54] METHOD FOR SENDING A SECURE MESSAGE IN A TELECOMMUNICATIONS SYSTEM

[75] Inventor: Tie Luo, Arlington, Tex.

[73] Assignee: Nokia Mobile Phones Limited, Espoo, Finland

[21] Appl. No.: 08/744,682

[22] Filed: Nov. 6, 1996

[51] Int. Cl.$^6$ ...................................................... H04L 9/08
[52] U.S. Cl. ................................ 380/21; 380/30; 380/49; 455/410
[58] Field of Search ........................ 455/26, 410; 380/30, 380/49, 21

[56] References Cited

U.S. PATENT DOCUMENTS 4,411,017 10/1983 Talbot ....................................... 455/411

OTHER PUBLICATIONS

Bruce Schneier, Applied Cryptography, Book, pp. 516–517, Oct. 18, 1995.
Menezes, Oorschot, Vanstone, Handbook of Applied Cryptography, Chapter 8, Oct. 1996.

*Primary Examiner*—Gail O. Hayes
*Assistant Examiner*—Ho S. Song
*Attorney, Agent, or Firm*—Brian T. Rivers

[57] ABSTRACT

A method for sending a secure message in a telecommunications system using public encryption keys. A sending transceiver encrypts the message c using the sender's own public encryption key Ex to generate Ex(c), and, transmits the encrypted message Ex(c) to a receiving transceiver. The receiving transceiver then encrypts the encrypted message Ex(c) using the encryption key Ey of the intended receiver of the message to generate the message Ey(Ex(c)), and, transmits the message Ey(Ex(c)) back to the sending transceiver. The sending transceiver then decrypts the message Ey(Ex(c)) using sender's private decryption key to generate Dx(Ey(Ex(c)))=Ey(c), and, transmits the message Ey(c) back to the receiving transceiver. The receiving transceiver then either decrypts the message using its own decryption key Dy, if it is the intended receiver of the message, to generate Dy(Ey(c))=c, or, forwards the message on to the intended receiver of the message, if it is not the intended receiver of the message, where the intended receiver decrypts the message using its own decryption key Dy.

10 Claims, 2 Drawing Sheets

METHOD FOR SENDING A SECURE MESSAGE IN A TELECOMMUNICATIONS SYSTEM

FIELD OF THE INVENTION

This invention relates to encryption techniques for telecommunications systems and, more particularly, to an apparatus and method for sending a secure message in a telecommunications system using public encryption keys.

BACKGROUND OF THE INVENTION

Advances in telecommunications systems technology have resulted in a variety of telecommunications systems and services being available for use. These systems include cellular telephone networks, personal communications systems, various paging systems, and various wireline and wireless data networks. Cellular telephone networks currently in use in the United States include the AMPS analog system, the digital IS-136 time division multiplexed (TDMA) system, and the digital IS-95 digital code division multiplexed (CDMA) system. In Europe the Global Services for Mobile (GSM) digital system is most widely used. These cellular systems operate in the 800–900 Mhz range. Personal communications systems (PCS) are also currently being deployed in the United States. Many PCS systems are being developed for the 1800–1900 MHz range, with each based on one of the major cellular standards.

In each of the above mentioned telecommunications systems, it may often be desirable for the operators of the system to provide secure communications to users of the system. This may include sending a secure message between two mobile stations operating in the system. In many cases the message may be a text message of finite length, such as a text message.

In analog systems, such as AMPS, it is very difficult to provide security for communications. The analog nature of the signals carrying the communication between two users does not permit easy or efficient encryption. In fact, in standard AMPS, no encryption is used and communications sent between a mobile station and base station may be monitored and intercepted. Anyone having a receiver capable of tuning to the frequencies used for the communication channels may intercept a message at anytime, without being detected. The possibility of interception has been one negative factor connected with analog systems such as AMPS. Because of this potential for interception, AMPS type systems have not been favored for certain business or governmental uses, where sending a secure message is a requirement.

The newer digital systems such as GSM, IS-136, and IS-95 have been developed so as to include encryption services for communications privacy. The digital nature of the speech or data signals carrying the communications between two users in these digital systems allows the signals to be processed through an encryption device to produce a communications signal that appears to be random or pseudorandom in nature, until it is decrypted at an authorized receiver. When it is desired to send a secure message in such a system, the encryption feature of the system can be used to encrypt the message. As an example, the short message service (SMS) feature specified in these standards could be used to send a text message that is encrypted according to the system encryption algorithm.

In the GSM, IS-136, and IS-95 systems, the encryption is performed on message transmissions between each user and the system by using a secret key value, "private key", where the key is known only to the system and the user communicating with the system. The system standards under consideration for PCS networks may also include encryption services that are based on the encryption techniques specified in the digital standard from which a particular PCS standard is derived, i.e., GSM, IS-136, or IS-95.

In GSM the system operator controls the security process by issuing a subscriber identity module(SIM) to each system user. The SIM is a plug-in chip or card that must be inserted into a mobile station that a user intends to make or receive calls through. The SIM contains a 128 bit number called the Ki that is unique for each user. The Ki is used for both authentication and deriving an encryption key. In GSM a challenge and response procedure is used to authenticate each user and generate encryption bits from Ki for the user. The challenge and response procedure may be executed at the discretion of the home system.

When a GSM mobile is operating in its home system, after the user has identified himself by sending in his international mobile system identity/temporary mobile system identities(IMSI/TMSI), a 128-bit random number (RAND) is generated in the system and combined with the mobile user's Ki to generate a 32-bit response (SRES). The system then transmits RAND to the mobile which, in turn, computes its own SRES value from the mobile user's Ki, and transmits this RAND back to the system. If the two SRES values match, the mobile is determined to be authentic. Encryption bits for communications between the mobile and systems are generated in both the mobile and network by algorithms using RAND and Ki to produce an encryption key "Kc". Kc is then used at both ends to provide secure communications. When a GSM mobile is roaming, the RAND, SRES and Kc values are transferred to a visited system upon registration of the user in the visited system or, upon a special request from a visited system. The Ki value is never available other then in the home system and the user's SIM.

The IS-136 and IS-95 authentication and encryption procedures are identical to each other and, similar to the GSM authentication and encryption procedures. In IS-136 and IS-95 systems a challenge response method is also utilized. The IS-136 and IS-95 method utilizes a security key called the "A-key". The 64-bit A-key for each mobile is determined by the system operators. The A-key for each mobile is stored in the home system of the mobile's owner and in the mobile itself. The A-key may be initially communicated to the mobile owner in a secure manner, such as the United States mail. The owner can then enter the A-key into the mobile via the keypad. Alternately, the A-key may be programmed into the mobile station at the factory or place of service. The A-key is used to generate shared secret data(SSD) in both of the mobile and the home system from a predetermined algorithm. SSD for each mobile may be periodically derived and updated from the A-key of that particular mobile by use of an over the air protocol that can only be initiated by the home system operator.

In IS-136 and IS-95 authentication and encryption, a 32-bit global challenge is generated and broadcast at predetermined intervals within systems in the service area of the mobile. When a mobile attempts system registration/call setup access in the home system, the current global challenge response is used to compute, in the mobile, an 18-bit authentication response from the mobile's SSD. An access request message, including the authentication response and a call count value for the mobile, is then sent to the home system from the mobile. Upon receiving the access request the home system will compute its own response value using the global challenge and the mobile's SSD. If the mobile is verified as authentic, by comparison of the authentication responses, the mobile's SSD and other relevant data, including the call count value, the mobile is registered.

When a mobile attempts system registration/call setup access in a visited system, the current global challenge response is used to compute, in the mobile, the 18-bit authentication response from the mobile's SSD. An access request message is then sent to the visited system from the mobile. For initial registration accesses in a visited system, the access request message includes the authentication response computed in the mobile. The authentication response and global challenge are then sent to the home system of the mobile, where the home system will compute its own response value using the global challenge and the mobile's SSD. If the mobile is verified as authentic, by comparing the authentication responses, the mobile's SSD and other relevant data, including the call count value, is then sent to the visited system and the mobile is registered. When a call involving the mobile is setup, a current authentication response value and call count are sent to the system from the mobile along with the call setup information. Upon receiving the call setup information, the visited system retrieves the stored SSD and call count values for the requesting mobile. The visited system then computes an authentication response value to verify that the the received SSD value and the current global challenge produce the the same response as that produced in the mobile. If the authentication responses and call counts match, the mobile is allowed call access. If communications security is desired, an encryption key is produced in both the mobile and system by using the global challenge and the mobile's SSD as input to generate encryption key bits.

Further background for such techniques as those used in GSM and, the IS-136 and IS-95 systems may be found in the article "Techniques for Privacy and Authentication in Personal Communications Systems" by Dan Brown in IEEE Personal Communications, dated August 1995, at pages 6–10.

While the above described private key procedures used in the GSM, IS-136 and IS-95 systems provide communications security, none of these procedures is entirely immune to interception and eavesdropping. All of the procedures require that a user's A-key or Ki value be known both in the mobile station and home system. They also require that the user's SSD or Kc value be known at both ends of the communications link, i.e., in the system and in the mobile. Each of these values could potentially be corrupted and become known to a potential interceptor. An individual knowing the Ki or A-key of a user, or an individual who intercepts the Kc or SSD of the user in intersystem communications, could potentially intercept and eavesdrop on communications that were intended to be secure and private. Additionally, since each user's keys are available at a base station with which they are communicating, encrypted communications involving two mobile stations connected through a base station of a system could be breached at the base station.

Public key encryption methods are methods in which a user is assigned a encryption key that is public, i.e., may be known and revealed publicly, but is also assigned a private decryption key that is known only to the user. Only an intended receiving user's decryption key can decrypt a encrypted message meant for the intended receiving user, i.e., decrypt a message encrypted using the intended receiving user's encryption key. In a public key encryption telecommunication system, the user would be allowed to keep the decryption key to himself, away from base stations or the system. Since the key necessary for decrypting a message is known only to the receiving user, public key encryption methods could provide more secure communications than are obtainable with the current encryption techniques being, used in, for example, GSM, IS-136, or IS-95.

In a cellular system using conventional public key encryption, if a mobile station X were to send a encrypted message to mobile station Y, mobile station X is required to know both the public encryption key for mobile station Y and, the algorithm that must be used with the encryption key of mobile station Y. It would also be required that Mobile X be capable of performing the encryption of the message using mobile station Y's encryption key and algorithm. These requirements of conventional public key encryption may present some difficulties or not be quite optimal for use in cellular systems in certain situations.

One difficulty in using public key encryption techniques is that the calculations involved in encryption and decryption may require much more in the way of computational resources then is required by private key systems. In a mobile station such computational resources may be limited. The requirements on resources may be even greater if two mobile station users desire to exchange a message securely, with each user using a different encryption/decryption algorithm. This could be the case, for example, when a roaming mobile station enters a system in which the system operator has implemented his own unique algorithm that is different from the roaming mobile station's home system's algorithm. In this case, each particular mobile station would be required to be capable of performing encryption with the other user's algorithm and, decryption with that particular mobile station user's algorithm. Such a requirement could be difficult to meet, for example, if the algorithm used for encryption required more computational resources then were available in the mobile station performing the encryption. Also, the code and data for performing particular algorithms would have to be stored in each mobile station or transmitted to the mobile station prior to commencement of encryption, creating further demands on mobile station computational resources.

Another potential difficulty in using public key encryption techniques in a cellular system involves the requirement that the sending mobile station should know the encryption key of the receiving mobile station in order to assure that the message is only available to the sending or receiving mobile stations. In certain public key encryption techniques the encryption keys may each be very large, possibly a sequence of numbers, and it may be difficult to store encryption keys for all potential receiving mobile stations in a single mobile station. It may also be difficult to transmit the key of a receiving mobile station to a sending mobile station on an as needed basis, for example during call setup, if the key is very large.

SUMMARY OF THE INVENTION

The present invention provides a method for sending a secure message in a telecommunications systems using public key encryption. The method is implemented in such a way that a particular user's decryption key is known only at the transceiving device of the particular user. The method is also implemented so that the transceiving device of the particular user needs only be capable of using that particular user's encryption/decryption algorithm and encryption key. This is done by using a particular sequence to exchange messages between two transceiving devices. The method avoids security problems associated with using private key methods and, also allows each mobile station to be able to perform only its own public key encryption/decryption algorithm. The method does not require that a transceiving device be able to perform encryption using the encryption key and algorithm of an intended receiver transceiving device as in conventional public key encryption. Computational resources in a transceiving device can therefore be optimized for one particular algorithm.

The method may be useful in providing highly secure, short message service (SMS) teleservices when a secure message is exchanged between two mobile stations or a mobile station and a cellular network, with each mobile station or the network using a different encryption/decryption algorithm. The method may also be useful in exchanging private keys between two communicating mobile stations or, a mobile station and a network, so that less computationally intensive private key algorithms may be used for longer communications, such as voice transmission. Additionally, the method may be used to transmit a secure authentication signature from one mobile station to another mobile station or network.

In an embodiment of the invention, a method for point to point encryption of a message exchanged between two users is implemented into a telecommunications system having at least one base station and a plurality of mobile stations. In the point to point embodiment, no decryption is performed in the base stations of the system. A user of mobile station M1 is assigned a publicly known (known to the system) encryption key Em1 and a decryption key Dm1 that is known only at mobile station M1 (the terms "encryption key Emx" and "decryption key Dmx" will be used herein to refer to both the algorithm and key values used in the algorithm, i.e., Emx is the encryption/decryption algorithm using the encryption key values and Dmx is the encryption/decryption algorithm using the decryption key values). Another system user of mobile station M2 is assigned a publicly known encryption key Em2 and a decryption key Dm2 that is known only at mobile station M2, where Dm1Em2=Em2Dm1. Dm1Em2=Em2Dm1 sets the restriction that applying Dm1 first to a message and then applying Em2, is the same as applying Em2 first and then Dm1 to the message. Only M1 knows Dm1 and only M2 knows Dm2. Also, M1 needs only to know Em1 and M1's particular encryption/decryption algorithm (A1) and, M2 needs only know Em2 and M2's particular encryption algorithm(A2).

When a user having mobile station M1 desires to send a secure communication c to a user of mobile station M2, the communication c is encrypted at M1 using Em1 and A1 to generate a message Em1(c). M1 then sends Em1(c) to a base station B1 of the system. The base station B1 then encrypts Em1(c) using Em2 and A2 to generate the message Em2 (Em1(c)) and sends it back to M1. Em2(Em1(c)) is next decrypted at M1 using Dm1 and A1. Since Dm1Em2=Em2Dm1, decrypting Em2(Em1(c)) using Dm1 results in Em2(c). M1 then sends Em2(c) to B1. B1 now sends Em2(c) to base station B2 that controls the area where mobile station M2 is located. Em2(c) is next sent to mobile station M2 and decrypted by mobile station M2 using Dm2 and A2 to generate the communication c sent by mobile station M1 to mobile station M2.

In another embodiment of the invention, a method of non-point to point encryption of communications between two mobile stations may be implemented into a telecommunications system. A system user of mobile station M1 is assigned a publicly known (known to the system) encryption key Em1 and a decryption key Dm1 that is known only at mobile station M1. M1 uses a encryption/decryption algorithm A1. Another system user of mobile station M2 is assigned a publicly known encryption key Em2 and a decryption key Dm2 that is known only at mobile station M2. M2 uses a encryption decryption algorithm A2. Also, each base station Bx of the system is assigned a publicly known encryption key Ebx and a decryption key Dbx that is known only to base station Bx. Each base station also performs encryption/decryption according to an algorithm Abx. The keys are chosen so that for any pair of a base station Bx and mobile station Mx which may communicate with each other, DmxEbx=EbxDmx.

In this embodiment, when user having mobile station M1 desires to send a secure communication c to a user of mobile station M2, the communication c is encrypted at M1 using Em1 and A1 to generate a message Em1(c). M1 then sends Em1(c) to a base station B1 of the system. The base station B1 then encrypts Em1(c) using Eb1 and Ab1 to generate the message Eb1(Em1(c)) and sends it back to M1. Eb1(Em1(c)) is next decrypted at M1 using Dm1 and Am1. Since Dm1Eb2=Eb2Dm1, decrypting Eb1(Em1(c)) using Dm1 results in Eb1(c). M1 then sends Eb1(c) to B1. B1 then decrypts Eb1(c) using Db1 and Ab1 to generate c and, sends c to a base station B2 that controls the area where mobile station M2 is located. The communication c between B2 and M2 may then be encrypted in an identical manner to that described for the transfer between M1 and B1, with B2, Eb2, Db2 and Ab2, in place of M1,Em1,Dm1 and Am1, and, M2, Em2, Dm2 and Am2, in place of B1,Eb1,Db1 and Ab1.

BRIEF DESCRIPTION OF THE DRAWINGS

A more complete understanding of the method of the present invention may be had by reference to the following detailed description when read in conjunction with the accompanying drawings wherein.

DETAILED DESCRIPTION OF THE INVENTION

Figure 1:
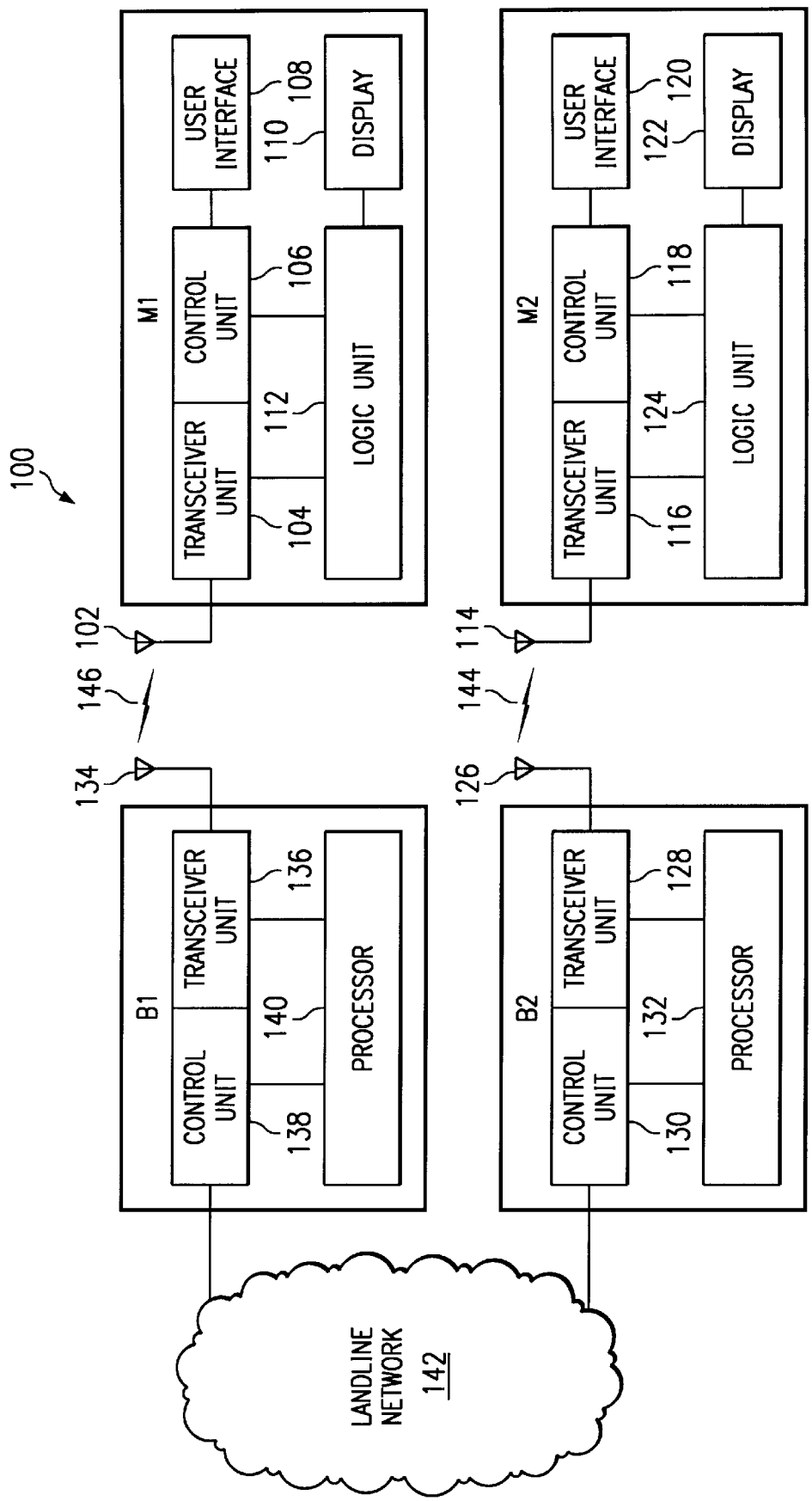
FIG. 1 illustrates a block diagram of a telecommunications system constructed according to an embodiment of the invention.

FIG. 1 illustrates a block diagram of a telecommunications system 100 constructed according to an embodiment of the invention. System 100 comprises base stations B1 and B2, land line network 142, and mobile stations M1 and M2. Although shown to include two base stations and two mobile stations, system 100 may comprise more or less base stations or mobile stations then are shown in FIG. 1. The mobile stations M1 and M2 may be mobile telephones that provide speech communications between a user of M1 or M2, and another mobile telephone or, between the user and a land line telephone connected to landline network 142. Mobile stations M1 and M2 may also be any other type of mobile communications device capable of operating according to the system standard for system 100, such as a personal communications device or a laptop computer operating through a wireless modem. Landline network 142 may be a public switched telephone network(PSTN) or a private landline network for system 100 that includes mobile switching centers for controlling call routing, registration and hand-off of a mobile from one base station to another in system 100. In system 100, mobile stations M1 and M2 may move about the coverage area of system 100 while communicating with the base stations of system 100 through RF links. In FIG. 1, mobile stations M1 and M2 are shown to be communicating with base stations B1 and B2, respectively, over RF links 144 and 146, respectively. System 100 may operate according to any telecommunications system standard that provides a digital interface over the RF links between mobile stations M1 and M2, and base stations B1 and B2. The design and operation of digital telecommunications systems is known and will not be described in detail here. System 100 may be implemented in any number of ways. For example, the digital RF interface in system 100 may operate according to a standard similar to the Telecommunications Industry Association/Electronic Industry Association (TIE/EIA) IS-136, IS-95, and PCS 1900 standards or the European GSM standard.

Mobile station M1 includes a transceiver unit 104 coupled to an antenna 102 for receiving radio signals from, and for transmitting radio signals to, base stations of system 100. Mobile station M1 includes a user interface 108, which could be a computer keyboard or a mobile telephone handset with a keypad, microphone and earpiece. Control unit 106 in mobile station M1 controls RF channel selection and other system functions in the conventional manner and, a logic unit 112 controls the general operation of the mobile station. Logic unit 112 may also be utilized to implement and perform encryption and decryption functions used for communications security. Display 110 provides a general visual interface to the user of mobile station M1 and is under control of logic unit 112. Mobile station M2 includes transceiver unit 116, user interface 120, control unit 118, logic unit 124, and display 122, each having the function as described for the corresponding section of mobile station M1.

Base station B1 includes a transceiver unit 136 coupled to antenna 134 for receiving radio signals from and, transmitting radio signals to mobile stations. B1 also includes control unit 138 and processor 140. Control unit 138 controls RF channel selection and assignment by generating the appropriate control messages to mobile stations, and also controls other necessary system functions such as interfacing with landline network 142. Processor 140 may be utilized to implement and perform encryption and decryption functions used for communications security. Base station B2 includes transceiver unit 128, antenna 126, control unit 130 and processor 132, each having the function as described for the corresponding section of base station B1.

In an embodiment of the invention an encrypted message may be passed from one user to another user in system 100, without the message being decrypted along the path from user to user. The message may only be decrypted by the intended receiver. The embodiment may be used to provide point to point communications between any two points in the system, including between two mobile stations, between a base station and a mobile station, and, between a mobile station and an appropriately equipped landline subscriber station.

For secure point to point message transmission, generally, each mobile station Mx of system 100 is assigned a publicly known encryption key Emx and a decryption key Dmx that is known only at mobile station Mx. For any two mobile stations M1 and M2 desiring to communicate, Dm1Em2 must equal Em2Dm1. However, the encryption algorithms used by each of M1 and M2 may be different. When the user of MS1 desires to send a secure communication c to a user of MS2, the communication c is encrypted at MS1 using Em1 and Am1 to generate an encrypted message Em1(c). MS1 then sends Em1 (c) to base station B1 of the system. The base station B1 then encrypts Em1 (c) using Em2 and Am2 to generate the message Em2(Em1(c)) and sends it back to MS1. MS1 next decrypts Em2(Em1(c)) using Dm1 and Am1. Since Dm1Em2=Em2Dm1, decrypting Em2(Em1 (c)) using Dm1 results in Em2(c). MS1 then sends Em2(c) to B1. B1 now sends Em2(c) to base station B2 that controls the area where MS2 is located. Em2(c) is next sent to MS2 and decypted by MS2 using Dm2 and Am2 to generate the decrypted communication c sent by MS1 to MS2.

Figure 2:
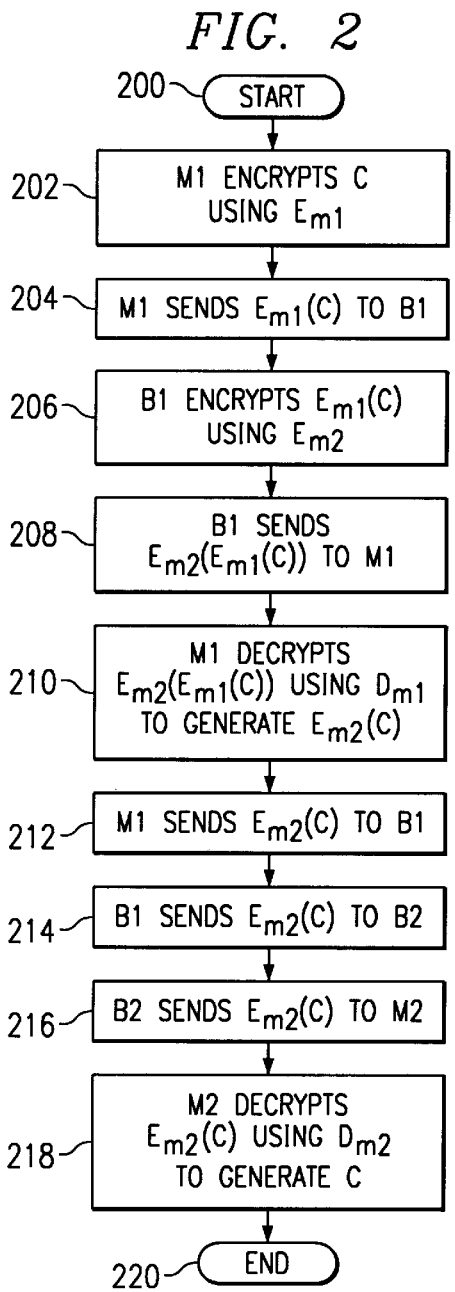
FIG. 2 is a flow diagram showing process steps performed to provide point to point encrypted communications within a telecommunications system according to an embodiment of the invention.

Referring now to FIG. 2, therein is illustrated a flow diagram showing process steps performed to provide point to point encrypted communications within a telecommunications system according to an embodiment of the invention. As an illustrative example, the case of a encrypted message transfer between mobile station M1 and mobile station M2 of FIG. 1 will be used to describe the process, with M1 using the the Rabin algorithm and, M2 using the Rivest, Shamir and Adleman (RSA) algorithm. A background description of the Rabin algorithm is given in the book "Cryptography, Theory and Practice" by Stinson, published by CRC, 1995, at pages 143–148. A detailed description of the RSA algorithm is given in the book "Digital Money" by Lynch et al., published by John Wiley and Sons, 1996, at pages 76–86.

The key functions Em1 and Dm1 for mobile station M1 may be chosen according to the Rabin critieria. In the Rabin algorithm, for this example, two prime numbers p and q are chosen using a selected predefined number N, where $p \times q = N$, and $p=4k_1+3$, and, $q=4k_2+3$, and where $k_1$ and $k_2$ are constants. N may be publicly known, while p and q must be kept private. Em1 is defined as $Em1(c)=(c)^2 \mod N$ and, DM1 is defined as $DM1(c)=c^{1/2} \mod N$, where c is the message to be transmitted. To solve DM1(c) for $c^{1/2}$, the equations $x^2=c \mod p$, and, $x^2=c \mod q$, are solved using the solutions, $x_1=\pm c^{(p+1)/4}$, and, $x_2=\pm c^{(q+1)/4}$. If two values a and b are found such that $ap+bq=1$, then $c^{1/2}$ can be found by the equation $c^{1/2}=bqx_1+apx_2 \mod N$.

The key functions Em2, Dm2, for mobile station M2 may be chosen according to the Rivest, Shamir and Adleman (RSA) criteria. In RSA two(large) prime numbers p and q are first selected, where $p \times q = N$. In this embodiment, N for M2 equals the N used for M1. This simplifies meeting the condition that Dm1Em2=Dm2Em1. However other values of N could be used as long as Dm1Em2=Em2Dm1. Two other values, a2 and b2, are then chosen, where $(a2)(b2)=1 \mod (p-1)(q-1)$. N and a2 may be public, and b2 must be kept private. Em2 and Dm2 are then defined as $Em2(c)=(c)^{a2} \mod N$, and, $Dm2 = (c)^{b2} \mod N$.

The process starts at step 200 where the encryption process is initiated in M1. At step 202, communication c is encrypted by logic unit 112 using Em1 and Am1, to generate the encrypted message $Em1(c)=(C)^2 \mod N$. The process then moves to step 204 where Em1(c) is transmitted through transceiver unit 104 from M1 to B1. After receiving Em1(c) through transceiver unit 136, processor 140 of B1 encrypts Em1(c) at step 206, using Em2 and Am2, to generate the encrypted message $Em2(Em1(c))=((c)^2)^{a2} \mod N$. The process then moves to step 208 where Em2(Em1(c)) is sent back to M1 from B1. Next at step 210, after receiving Em2(Em1(c)) from B1, logic unit 112 of M1 decrypts Em2(Em1(c)) using Am2(the Rabin algorithm) as described before. $(Em2(Em1(c)))^{1/2}=(((c)^2)^{a2})^{1/2}$. The generated message Dm1(Em2(Em1(c))) then equals $(c)^{a2} \mod N$, or the encrypted message Em2(c).

Next, at step 212, transceiver unit 104 of M1 sends the encrypted message Em2(c) to B1. Next, at step 214, control unit 138 of B1 then sends Em2(c) through landline network 142 to control unit 130 of B2. Since the message is encrypted, this is a secure communication. Next at step 216, after receiving Em2(c) through control unit 130 of B2, transceiver unit 128 sends Em2(c) to M2. At step 218 Em2(c) is decrypted in logic unit 124 of M2 using Dm2 and Am2 to generate Dm2(Em2(c)=((c)$^{a2}$)$^{b2}$ mod N, or, Dm2 (Em2(c))=c. M2 now has received the decrypted communication c.

In another embodiment of the invention, a non-point to point method is used to transfer a message from one user to another user in system 100. In this embodiment the message is decrypted at the base station in communication with the sending user. The message is then sent to the base station in communication with the receiver of the message and encrypted for transmission to the receiver of the message. In this embodiment, each of the communicating mobile stations or base stations need only know its own encryption key and encryption/decryption algorithm. The communicating entities need not know or be able to perform the encryption algorithm of any of the other communicating entities.

Generally, in this embodiment each mobile station Mx is assigned an encryption key Emx and a decryption key Dmx. Dmx is known only at mobile station x. Each base station Bx of system 100 is assigned an encryption key Ebx and a decryption key Dbx. Dbx is known only at base station Bx. For any pair of mobile and base stations Mx and By desiring to communicate with each other, DmxEby must equal Eby-Dmx.

When user of M1 desires to send a secure communication c to a user of M2, the communication c is encrypted by M1 using Em1 and Am1 to generate a message Em1(c). M1 then sends Em1(c) to base station B1 of the system. The base station B1 then encrypts Em1(c) using Eb1 and Ab1 to generate the message Eb1(Em1(c)) and sends it back to M1. M1 next decrypts Eb1(Em1(c)) using Dm1 and A1. Since Dm1Eb1=Db1Em1, decrypting Eb1(Em1(c)) using Dm1 and A2 results in Eb1(c). M1 then sends Eb1(c) to B1. M1 can be the only user who sends the correct Eb1(c) to B1 at this point. B1 now decrypts Eb1(c) using Db1 and Ab1 to generate c. B1 next sends c through the system to base station B2 that controls the area where user M2 is located. The communication c between B2 and M2 may then be encrypted in an identical manner to that described for the transfer between M1 and B1, with B2, Eb2, Db2 and Ab2, in place of M1,Em1,Dm1 and Am1, and, M2, Em2, Dm2 and Am2, in place of B1,Eb1,Db1 and Ab1.

Figure 3:
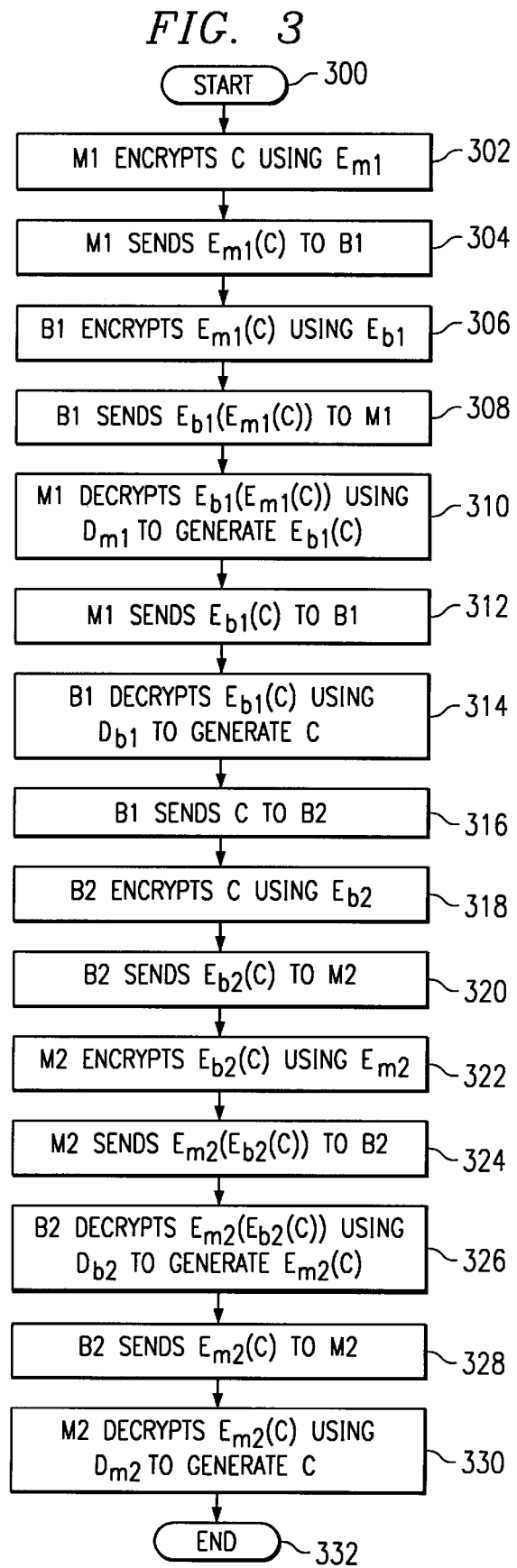
FIG. 3 is a flow diagram showing process steps performed to provide non point to point encrypted communications within a telecommunications system according to an embodiment of the invention.

Referring now to FIG. 3, therein is illustrated a flow diagram showing process steps performed to provide nonpoint to point encrypted communications within a telecommunications system according to an embodiment of the invention. The flow diagram of FIG. 3 can be used to describe an illustrative example, describing the case of a encrypted message transfer between mobile station M1 and mobile station M2 of FIG. 1. In this example, M1 and M2 use the Rabin algorithm and B1 and B2 use the RSA algorithm. The process used in FIG. 3 prevents mobiles M1 and M2 from having to perform the RSA algorithm used by the base stations.

The key functions Emy, Dmy, for mobile station My may be chosen according to the Rabin criteria. In the Rabin algorithm for this example, two prime numbers p and q are chosen using a selected number N, where p×q=N, and p=4k$_1$+3, and, q=4k$_2$+3, and where k$_1$ and k$_2$ are constants.

N may be publicly known, and p and q must be kept private. Emy is defined as Emx(c)=(c)$^2$ mod N and, DMy is defined as DMy(c)=c$^{1/2}$ mod N. To solve DMy(c) for c, the equations x$^2$=c mod p, and, x$^2$=c mod q, are solved using the solutions, x$_{1=±c}$$^{(p+1)/4}$,and, x$_2$=±c$^{(q+1)/4}$.If two values a and b are found such that ap+bq=1, then c can be found by the equation c$^{1/2}$=bqx$_1$+apx$_2$ mod N.

The key functions Ebx and Dbx for base station x may be chosen according to the Rivest, Shamir and Adleman(RSA) criteria. In RSA two(large) prime numbers p and q are first selected, where p×q=N. Two other values, ax and bx, are then chosen, where (ax)(bx) =1 mod (p−1)(q−1). Ebx and Dbx are then defined as Ebx(c)=(c)$^{ax}$ mod N, and, Dbx =(c)$^{bx}$ mod N. In this embodiment, N for B1 equals the N used for M1, and, N for B2 equals the N used for M2. This simplifies meeting the condition that Dm1Eb1=Eb1Dm1. However other values of N could be used as long as Dm1Eb1=Eb1Dm1 and, Dm2Eb2=Eb2Dm2.

The process starts at step 300 where the encryption process is initiated. Next at step 302, communication c is encrypted at logic unit 112 of M1 using Em1 and Am1, to generate the encrypted message Em1(c)=(c)$^2$ mod N. The process then moves to step 304 where Em1(c) is transmitted through transceiver unit 104 from M1 to B1. At step 306, after receiving Em1(c) through transceiver uit 136, B1 encrypts Em1(c) using Eb1 and Ab1, to generate the encrypted message Eb1(Em1(c))=((c)$^2$)$^{a1}$ mod N. The process then moves to step 308 where Em2(Em1(c)) is sent back through transceiver unit 136 to M1 from B1. Next, at step 310, after receiving Em2(Em1(c)) from B1 through transceiver unit 104, logic unit 112 of M1 decrypts Eb2 (Em1(c)) using Dm1 and Rabin's algorithm. as described before. (Eb2(Em1(c)))$^{1/2}$=(((c)$^2$)$^{a2}$)$^{1/2}$. The generated message Dm1(Eb2(Em1(c))) then equals (c)$^{a2}$ mod N, or the encypted message Eb2(c)

Next, at step 312, M1 sends the encrypted message Eb1(c) is sent to B1 through transceiver unit 104 and, at step 314 processor unit 140 of B1 then decrypts Eb1(c) using Db1 to generate Db1(Eb1(c)=((c)$^{a1}$)$^{b1}$ mod N=c. After the communication c is decrypted at processor 140 B1 the process moves to step 316 where the communication c is sent from control unit 138 of base station B1 through landline network 142 to control unit 130 base station B2. The transmission of communication c between B2 and M2 may then be performed in an identical manner to that described for the transfer between M1 and B1. This is illustrated by steps 318–330, which are identical to steps 302–314 with B2, Eb2, Db2 and Ab2, in place of M1,Em1,Dm1 and Am1, and, M2, Em2, Dm2 and Am2, in place of B1,Eb1,Db1 and Ab1.

The teachings of this invention should not be construed to be limited for use only with the telecommunications standards described, and should be construed to include any similar systems. Furthermore, other encryption algorithms than those expressly disclosed above may be employed to practice this invention.

Thus, the invention has been particularly shown and describer with respect to preferred embodiments thereof, and it will be understood by those skilled in the art that changes in form and details may be made without departing from the spirit and scope of the invention.

What is claimed is:

1. In a telecommunications system having at least one base station and a plurality of mobile stations, a method for sending a secure message, said method comprising the steps of:

assigning each mobile station a decryption key and an encryption key, wherein each encryption key is public;

encrypting a first message at a first mobile station using the encryption key of said first mobile station to generate a second message;

transmitting said second message from said first mobile station to said at least one base station;

encrypting said second message at said at least one base station, using the encryption key of a second mobile station, to generate a third message;

transmitting said third message from said at least one base station to said first mobile station;

decrypting said third message at said first mobile station, using the decryption key of said first mobile station, to generate a fourth message;

transmitting said fourth message from said first mobile station to said at least one base station;

transmitting said fourth message from said at least one base station to said second mobile station; and decrypting said fourth message at said second mobile station using the decryption key of said second mobile station to regenerate said first message.

2. The method of claim 1, wherein the decryption key and encryption key of said first mobile station and the decryption key and encryption key of said second mobile station are configured so that applying the encryption key of said second mobile station to a communication to obtain a first result, and then applying the decryption key of said first mobile station to the first result to obtain a final result, are equivalent in effect to applying the decryption key of said first mobile station to said communication to obtain a second result, and then applying the encryption key of said second mobile station to said second result to obtain said final result.

3. The method of claim 1, wherein said steps of encrypting and decrypting at said first mobile station are performed according to a first algorithm, and said steps of encrypting at said base station and decrypting at said second mobile station are performed according to a second algorithm.

4. The method of claim 3, wherein said first algorithm comprises an RSA type algorithm and said second algorithm comprises a Rabin type algorithm.

5. The method of claim 3, wherein said first algorithm comprises an Rabin type algorithm and said second algorithm comprises a RSA type algorithm.

6. In a telecommunications system, an apparatus for sending a secure message, said apparatus comprising:

a first mobile station, assigned a first decryption key and a first encryption key, said first mobile station for encrypting a first message using said first encryption key to generate a second message, transmitting the second message on an air interface, receiving a third message on said air interface, decrypting the third message using said first decryption key to generate a fourth message, and transmitting the fourth message on said air interface;

a base station, said base station for receiving the second message on said air interface, encrypting the second message using a second encryption key to generate the third message, transmitting the third message on said air interface to said first mobile station, receiving the fourth message on said air interface from said first mobile station, and transmitting a fifth message on said air interface, wherein the fifth message includes the fourth message; and a second mobile station, assigned a second decryption key and said second encryption key, said second mobile station for receiving the fifth message on said air interface from said base station and decrypting the fourth message included in the fifth message, using said second decryption key.

7. The apparatus of claim 6, wherein said first encryption key and said first decryption key and said second encryption key and said second decryption key are configured so that applying said second encryption key to a communication to obtain a first result, and then applying said first decryption key to the first result to obtain a final result are equivalent in effect to applying said first decryption key to said communication to obtain a second result, and then applying said second encryption key to said second result to obtain said final result.

8. The apparatus of claim 7, wherein encrypting and decrypting at said first mobile station are performed according to a first algorithm, and encrypting at said base station and decrypting at said second mobile station are performed according to a second algorithm.

9. The apparatus of claim 8, wherein said first algorithm comprises an RSA-type algorithm and said second algorithm comprises a Rabin-type algorithm.

10. The apparatus of claim 8, wherein said first algorithm comprises a Rabin-type algorithm and said second algorithm comprises an RSA-type algorithm.

* * * * *

UNITED STATES PATENT AND TRADEMARK OFFICE
CERTIFICATE OF CORRECTION

PATENT NO. : 5,909,491

DATED : June 1, 1999

INVENTOR(S) : Tie Luo

It is certified that error appears in the above-identified patent and that said Letters Patent is hereby corrected as shown below:

Column 11, line 36, after "said" insert --at least one--.

Column 12, line 9, delete "a" and insert --at least one--.

Column 12, line 9, after "said" insert --at least one--.

Column 12, line 21, after "said" insert --at least one--.

Column 12, line 35, change "7" to --6--.

Column 12, line 37, after "said" insert --at least one--.

Signed and Sealed this

Fourteenth Day of September, 1999

Attest:

Q. TODD DICKINSON

*Attesting Officer*     *Acting Commissioner of Patents and Trademarks*